Figure 6:
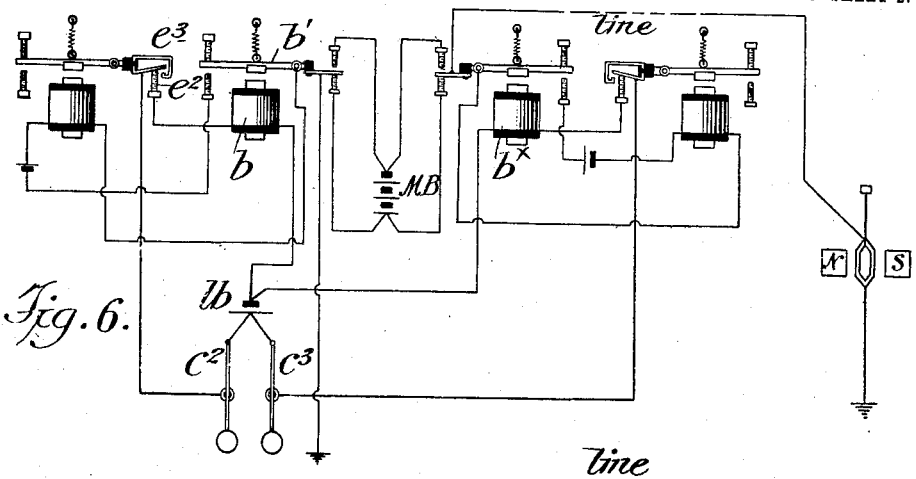

P. B. DELANY.
TELEGRAPHY.
APPLICATION FILED MAY 24, 1905.
918,293.
Patented Apr. 13, 1909.
3 SHEETS—SHEET 1.
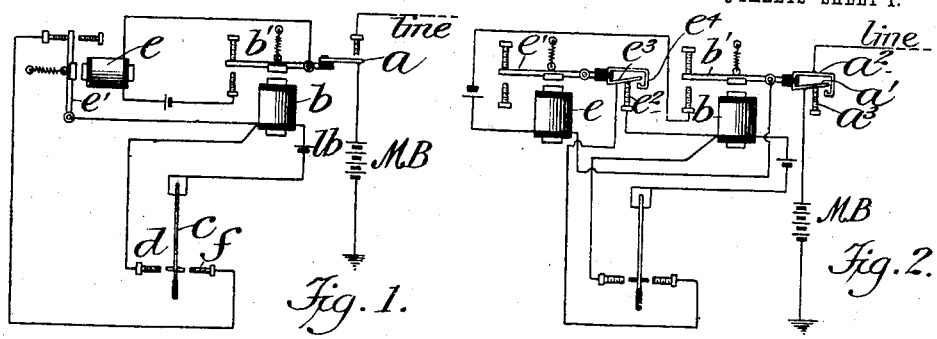
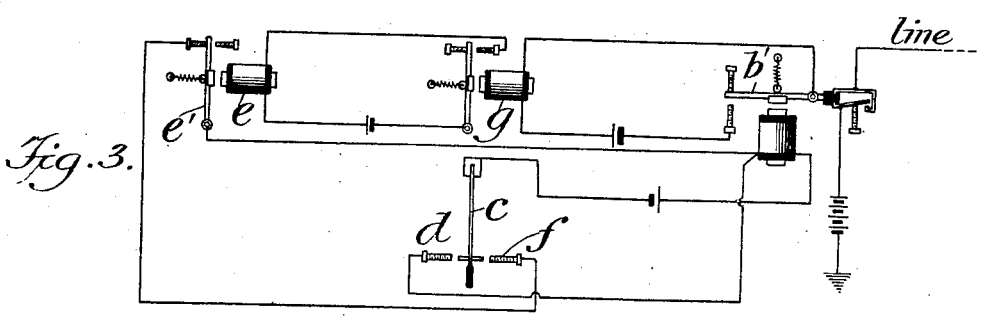
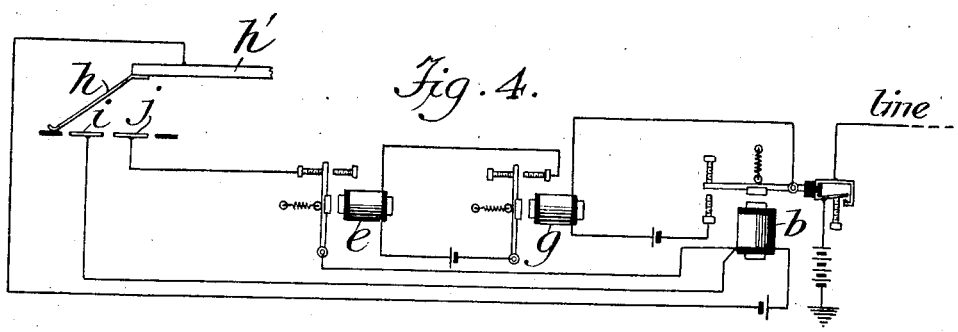
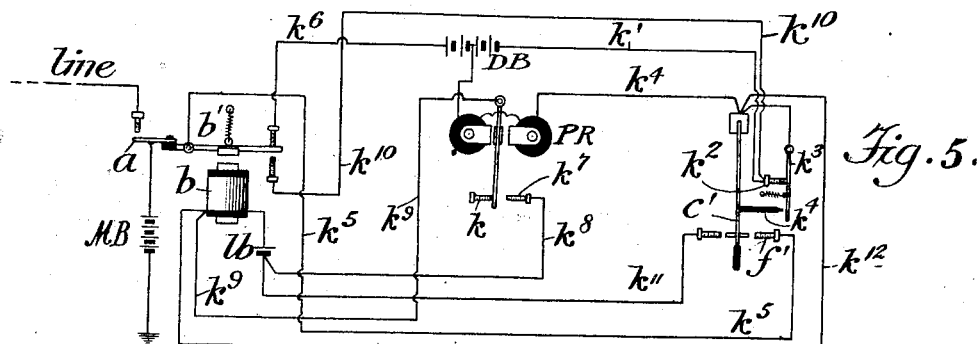
WITNESSES:
A. K. Appleman
L. F. Browning
INVENTOR
Patrick B. Delany
BY his ATTORNEY
Edward C. Davidson

P. B. DELANY.
TELEGRAPHY.
APPLICATION FILED MAY 24, 1905.

918,293.

Patented Apr. 13, 1909.
3 SHEETS—SHEET 2.

WITNESSES:
INVENTOR
BY HIS ATTORNEY

P. B. DELANY.
TELEGRAPHY.
APPLICATION FILED MAY 24, 1905.

918,293.

Patented Apr. 13, 1909.
3 SHEETS—SHEET 3.

UNITED STATES PATENT OFFICE.

PATRICK B. DELANY, OF SOUTH ORANGE, NEW JERSEY.

TELEGRAPHY.

No. 918,293.  Specification of Letters Patent.  Patented April 13, 1909.

Application filed May 24, 1905. Serial No. 262,097.

*To all whom it may concern:*

Be it known that I, PATRICK B. DELANY, a citizen of the United States, residing at South Orange, in the county of Essex and State of New Jersey, have invented certain new and useful Improvements in Telegraphy, of which the following is a specification.

I employ an arrangement of electro magnetic devices for the purpose of transmission, and so organize and arrange them that during the period of time required for the transmission of a series of signals, the transmitting apparatus, whether it be a manually operated key, a key board transmitter, or a slotted tape transmitter, closes a local circuit without direct transmission of any impulse into the line; and during such closure of the local circuit the local electro magnetic devices automatically transmit into the line or main circuit the number of dots corresponding with the period of time during which the transmitting device keeps said local circuit closed. In the case of transmission by a manually operated key, the dots so sent into the main circuit are made manifest to the operator, either audibly or otherwise, and guide him as to the length of time during which he should hold the key closed. In the case of transmission of a dash, the period during which the operator shall hold his key closed is determined by himself, since it is preferred that the transmission of the dash impulse be determined in the ordinary way by the operator, and it may be sent into the circuit direct from the key or by an interposed relay or other device. Where transmitters other than manually operated keys are employed, the period of time during which the local circuit shall be closed, and the electro magnetic devices automatically operated to send into the main circuit a corresponding number of dots, is arbitrarily determined by the construction of the instrument employed, and therefore there is no necessity that their transmission be indicated to the operator. I am aware that heretofore such a method of transmission with a manually operated key has been proposed, but either a mechanical vibrator for opening and closing the main circuits have been employed, or a single circuit closing and breaking local electro magnet has been used. In these cases, experience has shown that the signals transmitted are not always uniform; it has been difficult to properly control the speed of the automatic transmission of dot impulses according to the ability of the sending operator to read them, or of the circuit to properly receive and transmit them so that they will be distinctively manifested at the receiver.

According to the plan of the present invention, the transmission of dot signals is effected by the combined use of two or more electro magnetic devices, the first one of which, on the closing of the local circuit by a manually operated key, or other contact device, closes the circuit to be charged, and the last one of which thereafter breaks such circuit. This operation will be repeated as long as the primary contact of the transmitting device or other instrument is closed. Such automatic operation, or the speed of vibration of the armature lever of the primary local magnet may, therefore, be controlled to act with great uniformity and desired frequency. In this way, dot signals sent into line are made uniform, and the personal characteristics of an operator manipulating the key are eliminated. Any desired number more than two of the local magnetic devices may be used as desired, to control the speed with which the dots are formed. In the case of a hand operated key, it is obvious that such speed should be slower than when a key board or slotted tape transmitter is employed. In such latter cases, the speed of transmission is only limited by the character of the circuit and means of reception of the signals.

In the accompanying drawing: Figures 1 to 9 show various embodiments of this invention.

In Fig. 1, MB is the transmitting generator shown as connected to a contact tongue *a* working against a line contact and mounted on the vibrating armature lever *b'*, of a local magnet *b*. This magnet is included in a local circuit containing a local battery *l b*, one pole of which is connected with a key *c*. The other pole is connected through the windings of *b*, and is then branched, one branch passing to dash forming contact *d* of the key; and the other to the heel of the armature lever *e'* of a local magnet *e*, and from the back stop of such armature lever to dot forming contact *f* of the key. The local circuit of the magnet *e* is closed at the front stop of the armature lever *b'* of magnet *b*. The operation is as follows:

When the key is moved to the left to transmit a dash, magnet $b$ is energized and contact tongue or finger $a$ passes to the line contact. This condition is maintained as long as the key is held against its stop $d$, and a dash impulse will be sent from the generator MB into line. When the key is moved to the right, the circuit of $b$ is completed through its local battery and armature lever $e'$ of the magnet $e$ to key contact $f$, magnet $b$ energized, and the main battery put to line. Soon thereafter, however, the magnet $e$ is energized by the closing of its local circuit, and the circuit of $b$ is broken at the armature lever $e'$, disconnecting the main battery from line. This oscillatory or vibratory action is repeated with uniform period of time so long as the key $c$ is held against its stop $f$, and when the required number of dots has been so transmitted, the operator being audibly apprised thereof, releases the key. The magnet $b$ may properly be designated as a sounder, since it makes audible to the operator the transmitted dots.

In Fig. 2, the transmitting generator MB is connected to an insulated spring tongue $a'$ on the armature lever $b'$ and the line is connected to a hooked contact plate $a^2$ on the same armature lever, and from the hooked end of which the tongue $a'$ is normally disengaged,—that is, when the armature lever is retracted because of its impingement upon a fixed stop $a^3$. One branch of the local circuit $b$ passes to a contact post $e^2$, against which normally bears an insulated spring tongue $e^3$. The operation is as follows: When $b$ is energized and its armature lever attracted, $a'$ is permitted to pass into engagement with $a^2$ and thereby put the main battery to line. When the local circuit of magnet $e$ is closed and armature lever $e'$ is attracted, the contact tongue $e^3$ thereon remains against the post $e^2$ until it engages the hooked arm $e^4$, on the armature lever when by the continued movement of that lever, it is lifted out of engagement with the contact post, thereby breaking the circuit of $b$. The purpose of this arrangement is to afford a slower rate of transmission of dot signals. Obviously, the interval of time between closure of circuit $b$ and its opening at contact post $e^2$ will be greater than with arrangement shown in Fig. 1. By proper arrangement and adjustment, the desired rate of automatic vibration of armature lever $b'$, and consequently of the speed of transmission of dot signals may easily be regulated.

In Fig. 3, the arrangement of the line contact carried by the armature lever $b'$ is the same as in Fig. 2. In this case, however, there is interposed between the magnets $e$ and $b$ a third magnet $g$. The interval of time occurring between the automatically transmitted dots may obviously be increased, by this arrangement, over what is possible with the plan shown in Fig. 1.

Fig. 4 is like Fig. 3, except that in lieu of the key $c$ and its contact posts $d$, $f$, I have shown a spring arm trailer $h$ carried by the endwise reciprocating bar $h'$ of a key board transmitter and traversing a series of contacts. In the present instance, two active contacts $i$, $j$, are shown in this series. While $h$ is passing over $i$, the circuit of magnet $b$ will remain closed and a dash will be transmitted to line. While $h$ is passing over $j$, the circuit of $b$ will be automatically opened three times by the action of the magnets $e, g$, thereby transmitting three dots which with the dash, forms letter "b" of Morse code.

In Fig. 5, the armature lever of polarized relay PR is normally held against its open stop $k$, by that portion of the divided battery DB connected by wire $k'$ to contact $k^2$, and thence by a spring contact arm $k^3$ and wire $k^4$ to the relay PR. When the key $c'$ is moved to the right, the contact between $k^3$ and $k^2$ is broken by the insulated key point $k^4$; and key $c'$ making contact with stop $f'$, the polarized relay PR is energized by the current from the other half of the divided battery DB, the circuit being from $f'$ by wire $k^5$, to armature lever $b'$, and by wire $k^6$ to the battery DB. The armature lever of the polarized relay passes to its opposite contact $k^7$ thereby closing the local circuit of the magnet $b$ through wire $k^8$, local battery $l\ b$, and wire $k^9$ to the armature lever of the polarized relay. When the armature lever $b'$ reaches its lower contact post, the polarized relay is again reversed, the circuit being by wire $k^{10}$ to contact $k^2$, and wire $k'$, through battery DB polarized relay PR, wire $k^4$ to key $c'$ and contact $f'$ to armature lever $b'$. When the polarized armature lever leaves contact $k^7$, the circuit of $b$ is broken. Therefore, so long as key $c'$ is held to the right, the relay PR and magnet $b$ are automatically operated and dots will be sent into line from the main battery MB by means of the insulated spring contact $a$. To send a dash, key $c'$ is moved to the left, thereby closing the circuit of $b$ continuously through wire $k^{11}$ battery $l\ b$ and wire $k^{12}$.

Fig. 6 shows the application of this system to cable telegraphy. In this case, there are two keys $c^2$, $c^3$. When key $c^2$ is depressed the circuit of magnet $b$ is completed through the separable contacts $e^2$, $e^3$, and the bottom contact of the key. Armature lever $b'$ is, therefore, automatically vibrated so long as the key remains closed, and a succession of impulses of one polarity representing dot signals is sent to line through one set of the pole changing contacts of the generator MB which is shown grounded as usual. When the key $c^3$ is depressed, the circuit of magnet $b^x$ is completed and then automatically opened and closed so long as the key $c^3$ is depressed, transmitting into the line a succession of dot signals of uniform polarity but opposite to those sent when the key $c^2$ is depressed. The record on a receiving tape made with a tape siphon recorder being, for instance, of the character shown in Fig. 11ª, the number of dot definitions appearing upon the tape on either side of its medial line being determined by the period of time during which the key $c^2$ or $c^3$ is held depressed.

Figure 7:
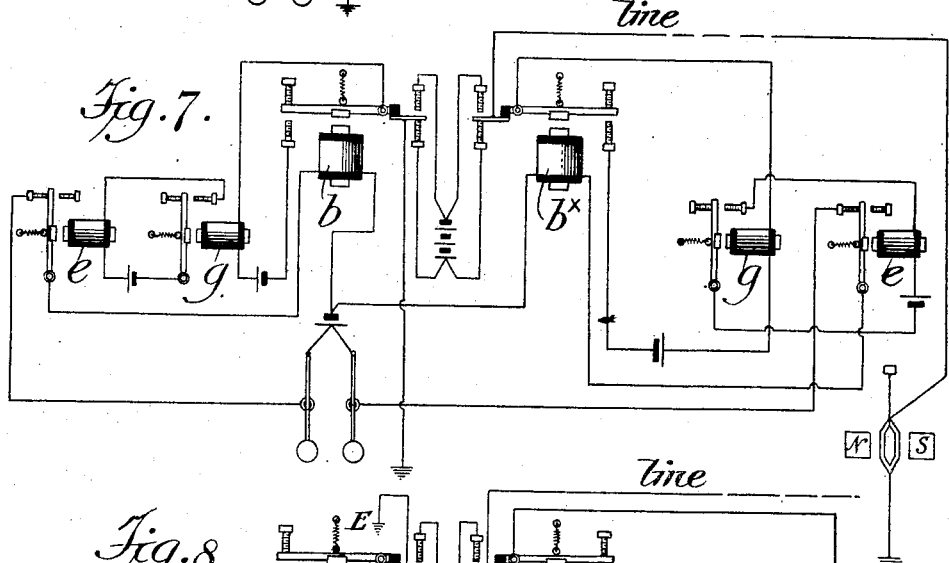

Fig. 7 is in all respects the same as Fig. 6, except that in connection with each magnet $b$, $b^x$, are employed two local magnets $g$, $e$, as in Fig. 3.

Figure 8:
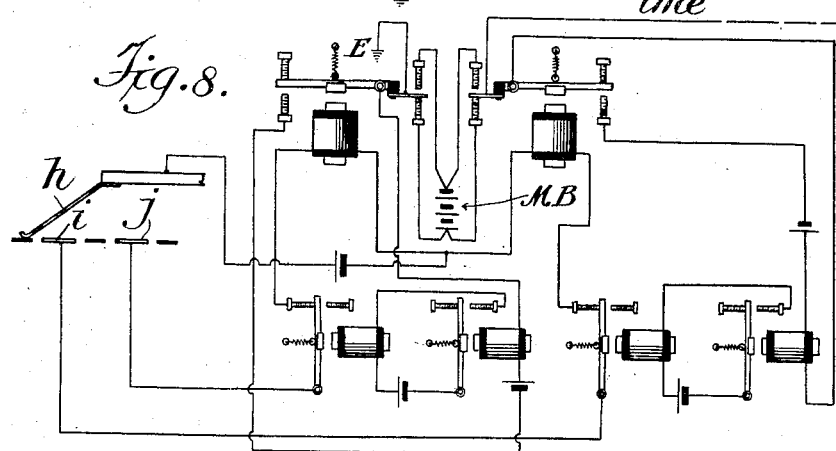

In Fig. 8, the arrangement is the same as in Fig. 7, except that instead of two keys $c^2$, $c^3$, the trailing contact $h$ of a keyboard transmitter is shown as passing over a series of contacts, of which $i$, $j$, are the active contacts. In this case, however, dot impulses of current of one polarity will be sent from the generator MB when the trailer is upon $i$, and when it is upon $j$ dot impulses of current of opposite polarity will be sent.

Figure 9:
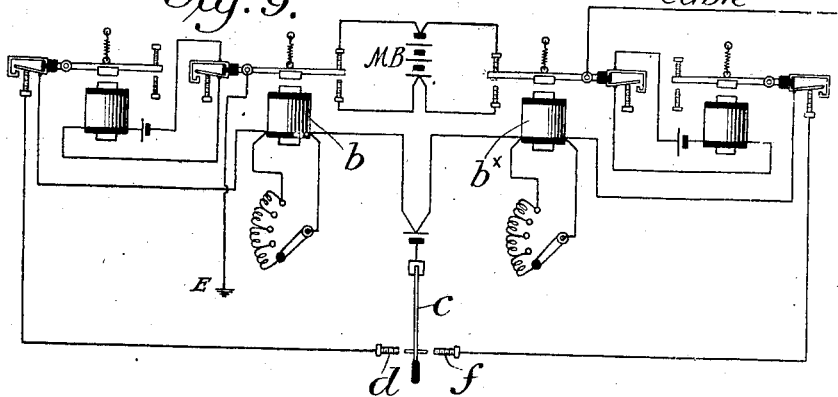

In Fig. 9 a single key $c$, like that shown in Fig. 1, is employed, and a succession of dot signals is sent when the key is in either position—against its stop $d$ or its stop $f$. The arrangement of the magnets $b$, $b^x$, and their circuit connections and contacts are as in Fig. 2. In this figure I have shown an adjustable resistance in shunt around the windings of each magnet $b$, $b^x$, to regulate their speed of charge and discharge.

I claim as my invention:—

1. In telegraphy, the combination of means adapted to close a gap in a local circuit during a period of time required for automatic formation of a succession of dot signals, a magnet in said local circuit, and another magnet through the normally closed but separable contacts of whose armature such local circuit is completed, and the local circuit of such other magnet normally open but controlled for closure at the normally open contacts of the first-named magnet, and line transmitting contacts controlled by one of said magnets, whereby during the period of closure of the gap in the first-named local circuit a succession of dot signals will be automatically formed.

2. In telegraphy, the combination of means adapted to close a gap in a local circuit, a magnet in the local circuit, a second magnet whose local circuit is controlled at the normally open contacts of the armature lever of the first magnet, a third magnet whose local circuit is controlled at the normally open contacts of the armature lever of the second magnet and through the normally closed but separable contacts of whose armature lever the first-named local circuit is closed, and line transmitting contacts controlled by one of said magnets, whereby during the period of closure of the gap in the local circuit a succession of dot signals is automatically formed.

3. In telegraphy the combination of a transmitting device adapted to close a gap in a local circuit, a magnet in the local circuit, a second magnet whose local circuit is controlled at the normally open contacts of the armature lever of the first magnet, a third magnet whose local circuit is controlled at the normally open contacts of the armature lever of the second magnet and through the normally closed but separable contacts of whose armature lever the first-named local circuit is closed, and line transmitting contacts controlled by one of said magnets, whereby during the period of closure of the gap in the local circuit by the transmitting device a succession of dot signals is transmitted into the line at uniform regulated rates.

4. In telegraphy, a transmitter, a local circuit controlled thereby, a local battery and electro-magnet included therein, a key for closing said circuit, a second electro magnet, and its normally open circuit controlling the circuit of the first named magnet, circuit connections and contacts whereby the circuits of said second electro-magnet are automatically opened and closed, and line transmitting contacts controlled by the armature lever of one of said magnets to send into the line a succession of impulses, each of which constitutes a dot of a telegraph code, during the time the circuit of the first named magnet is closed at the key.

In testimony whereof, I have hereunto subscribed my name.

PATRICK B. DELANY.

Witnesses:
L. F. BROWNING,
E. F. WICKS.